United States Patent [19]

Harding et al.

[11] Patent Number: 4,974,156

[45] Date of Patent: Nov. 27, 1990

[54] MULTI-LEVEL PERIPHERAL DATA STORAGE HIERARCHY WITH INDEPENDENT ACCESS TO ALL LEVELS OF THE HIERARCHY

[75] Inventors: Warren B. Harding; Robert D. Tennison; William O. Vomaska, all of Tuscon, Ariz.

[73] Assignee: International Business Machines, Armonk, N.Y.

[21] Appl. No.: 190,421

[22] Filed: May 5, 1988

[51] Int. Cl.$^5$ .............................................. G06F 12/08
[52] U.S. Cl. .................................. 364/200; 364/243.4; 364/243.2; 364/256.4; 364/252.2
[58] Field of Search ................................ 364/200, 900

[56] References Cited

U.S. PATENT DOCUMENTS

| 4,500,954 | 2/1985 | Duke et al. | 364/200 |
| 4,608,679 | 8/1986 | Rudy et al. | 369/36 |
| 4,636,946 | 1/1987 | Hartung et al. | 364/200 |
| 4,638,425 | 1/1987 | Hartung | 364/200 |
| 4,680,700 | 7/1987 | Hester et al. | 364/200 |
| 4,771,375 | 9/1988 | Beglin et al. | 364/200 |
| 4,851,993 | 7/1989 | Chen et al. | 364/200 |
| 4,875,155 | 10/1989 | Iskiyan et al. | 364/200 |

OTHER PUBLICATIONS

*IBM Technical Disclosure Bulletin,* vol. 20, No. 3, Aug. 1977, "Multilevel Store Directory Integrity", R. L. Blickenstaff et al., pp. 939–940.

*Primary Examiner*—Gareth D. Shaw
*Assistant Examiner*—Maria Napiorkowski
*Attorney, Agent, or Firm*—Manny W. Schecter

[57] ABSTRACT

A peripheral data storage hierarchy includes three storage levels. The top storage level is a fast accessing direct access storage device(s), such as magnetic disk drives. The intermediate level is an automatic warehouse type library, storing a large plurality of optical disks, which are automatically transferred between storage cells of the library and optical disk drives operatively connected to the host processor. The bottom level of the storage hierarchy includes one or more stand-alone optical disk drives and a shelf unit. Personnel manually carry the optical disks between the stand-alone drives and the shelf unit upon mount and demount commands received from the host processor. The intermediate library level uses the same type of optical disk as used in the bottom level of the data storage hierarchy. An I/O station in each of the automatic libraries enables manual access to the optical disk for transferring the optical disks between the intermediate and bottom levels. Preferably, the transfer is only from the intermediate level to the bottom level. Access to named storage objects in disks stored in the bottom level are through the stand-alone drives. A host processor has an independent access path to each level of the data storage hierarchy. A directory and other data structures indicate the number of copies made of each named data object and the location of such copies, such that the host processor 10 can independently access a copy from any level of the data storage hierarchy.

7 Claims, 2 Drawing Sheets

MULTI-LEVEL PERIPHERAL DATA STORAGE HIERARCHY WITH INDEPENDENT ACCESS TO ALL LEVELS OF THE HIERARCHY

FIELD OF THE INVENTION

The present invention relates to peripheral data storage hierarchies attachable to data processing systems and particularly to peripheral data storage hierarchies that are capable of storing extremely large quantities of data.

BACKGROUND OF THE INVENTION

Ever since the advent of digital computers with substantial calculation capabilities, data has been stored externally to the host processor. Even with relay computers of the 1940's, both the program and data storage were separate peripheral data storage systems, each of which provided unit record cards readable by card readers or punched paper tape, which were inputs to the relay computers. With the advent of digital electronic circuits, the demand for greater capability of peripheral data storage became intensified. Magnetic tape and magnetic disks are used as peripheral data storage, wherein data stored on the tapes or disks were read into an electronic memory of the host processor. The addressing of all of the above described peripheral data storage used a single address space for addressing the readers or recorders associated with the peripheral record media. As demand for greater storage capacity continued to increase along with increased computing capabilities, the concept of a data storage hierarchy evolved. In larger data processing installations, the plurality of magnetic tape and magnetic disk recorders and reproducers provides a broad single address base peripheral storage for the data processing installation. Often, along side such peripheral equipment is a true peripheral data storage hierarchy. An example of such a data storage hierarchy is the IBM 3850 Mass Storage System. It is to be understood that other data storage hierarchies also have been employed, but which it is believed did not follow the same addressing and access principles described herein. The IBM 3850 is schematically illustrated in the IBM TECHNICAL DISCLOSURE BULLETIN, article by Blinckenstaff et al., entitled "Multi-level Store Directory Integrity", August 1977, pp. 939–940. In that peripheral data storage hierarchy a lower level of the hierarchy was a magnetic-tape automatic warehouse-type library. The upper level of the peripheral data storage hierarchy consists of a plurality of direct access storage devices (DASD) which is another name for magnetic disk recorders. Addressing in the IBM 3850 was in a single address field, using virtual addressing techniques. Access to all of the data stored in the hierarchy was through the upper level DASD units.

Magnetic tape and magnetic disk peripheral storage subsystems often employ removable media. Such media when removed from the recorder/reproducers were often stored on shelves. The removable media are manually transferred between the shelves and the recorder/reproducers. A mount or demount message is supplied by the using host processor to a console adjacent the recorder/reproducers and convenient to the shelf storage. Operators read the host processor messages and manually carry the removable media from the storage shelves and mount the removable media on either the tape drives or disk drives (drive is another name for recorder/reproducer). The host processor access to all of the data stored on the removable media is only through tape or disk drives. The addressing is based upon the drive address independent of the access paths which may extend between the host processor and the various drives. Each of the tape reels or disk packs would be assigned a volume serial number, often referred to as VOLSER. In general, the recorded tapes are read in their entirety, in one read operation. Recording on the tape is also effected in a single set of recording operations, i.e. there is no "update in place" on magnetic tape.

With the advent of disk drives, having nonremovable media and an increasing requirement for fast access to peripherally stored data, a random access semiconductor cache was disposed intermediate the disk drive and the host processor. In some of these cached disk drive subsystems, the only access to the data was through the cache. In other of these cached disk drive subsystems, such as shown by Duke et al. in U.S. Pat. No. 4,500,954, the cache could be bypassed for directly accessing the disk drive for recording or reading data. The addressing field of such subsystems was based upon the address space used for accessing data areas of the disk drive. Any data stored in the semiconductor cache is accessed by using the address of the disk drive by checking the cache to see whether or not the data area was allocated in the cache for such disk drive address. Then, if the cache had an allocated area for such address, the host processor accesses the cache allocated area. The disk drives could also be directly accessed whenever the semiconductor cache was out of operation. In some instances, upon a situation wherein the cache did not have allocated space, the cache is bypassed and all of the data would be read from the disk drive directly. Such an arrangement obviated the need for moving the data from the disk drive to the cache, storing it in the cache and then signaling the host processor to fetch the data or write the data to the cache. Accordingly, copies of the data stored in such cached disk drive subsystems were not always acquired from the level having the fastest access. The Duke et. al. U.S. Pat. No. 4,500,954 teaches that recording data into a cached disk drive subsystem may be benefited by not using the cache, i.e. using the cache would degrade performance. Both the cache and disk recorder show host processor access paths; neither the cache nor the disk recorder have separate and independent access paths to the host recorder.

In spite of all of the above described peripheral data storage systems, there is still a need for a peripheral data storage hierarchy that is capable of efficiently storing and retrieving larger amounts of data than previously stored.

SUMMARY OF THE INVENTION

According to the invention, a peripheral data-storage hierarchy has a plurality of data storage levels, each level having a plurality of data storing elements. Each of the storage levels have different access characteristics varying from a shortest access at the top of the hierarchy to the longest access at the bottom of the hierarchy. A single directory identifies the location of named data objects and copies thereof which are stored at diverse levels of the peripheral data storage hierarchy. A data object access means, coupled to the directory and to all of the levels through plural independent paths, identifies the level having a copy of the named data object which has the shortest access time. This copy of the named data object is retrieved. Named data objects stored in lower levels of the peripheral data storage hierarchy are accessed directly from such lower levels via one of the independent paths without processing the named data objects through any of the intermediate or higher levels of the data storage hierarchy.

The foregoing and other objects, features, and advantages of the invention will be apparent from the following more particular description of preferred embodiment of the invention, as illustrated in the accompanying drawings.

DETAILED DESCRIPTION OF THE PREFERRED EMBODIMENT

Figure 1:
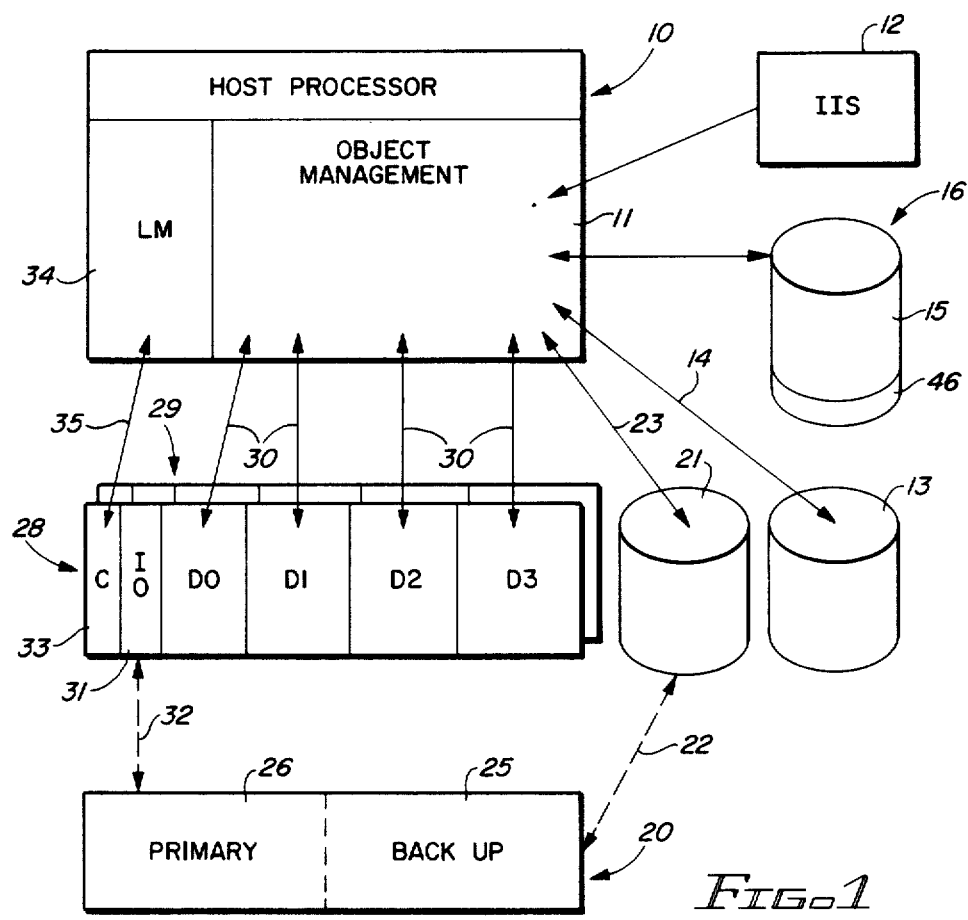
FIG. 1 is a simplified diagrammatic showing of a peripheral data storage hierarchy connected to a host processor, which embodies the principles of the present invention.

A host processor 10 includes an object management program in storage area 11 which is a portion of its main memory. Input named data objects are sequentially received from Image input systems IIS 12. Each data object is an image of a document such as a negotiable instrument, letter, contract, etc. The object management program initially stores the received named data objects in a peripheral disk drive object store 13 (store or disk drive 13 may in fact be a large plurality of disk drives), which constitutes an upper or first level of the peripheral data storage hierarchy. Double-headed arrow 14 signifies that host processor 10 not only stores the received named data objects in disk drive 13, but also retrieves the named data objects from the disk drive 13 as a work in process data object.

Each time a named data object is received, a retentively stored object catalog 15 is updated, the catalog 15 is stored in peripheral disk drive 16. Object catalog 15 includes the name of the received data object, the number of copies stored on all the levels of the peripheral data storage hierarchy, and which levels of the peripheral data storage hierarchy have a copy for each and every named data object received from IIS 12. Disk drives 13 and 16 are preferably of the magnetic recording type.

The remainder of the peripheral data storage hierarchy stores the received named data objects onto two sided optical write once read many (WORM) disks. Each side of an optical disk stores a volume of data, separately identified by a volume serial number VOLSER. For purposes of brevity, VOLSER A identifies the volume on side 0 of the disk, while VOLSER B identifies the volume on side 1 of the disk. Each of the optical disks constitute a removable record medium.

The bottom storage level of the peripheral data storage hierarchy consists of a storage shelf 20, capable of storing a large number of the optical disks. Stand-alone optical disk recorder or optical drive 21 is a portion of the third or bottom level of the illustrated peripheral data storage hierarchy. Optical disks in a first embodiment of the invention were manually transferred from the storage shelf 20 to the optical drive 21 as indicated by dashed line doubleheaded arrow 22. Optical drive 21 (there may be in fact several of such stand-alone optical drives) is directly operatively connected to host processor 10 as indicated by double-headed arrow 23. The object management program in the storage area 11 of host processor 10 identifies certain ones of the received named data objects for periodic backup after the received named data objects are stored in disk drive 13. The backup copy of such objects is recorded onto an optical disk (not shown) in recorder 21. Such backup copies are logically outside the data storage hierarchy. Each time an optical disk in optical drive 21 is filled to capacity, host processor 10 issues a demount message to the personnel working in the area of storage shelf 20 to demount the optical disk and to store it at a predetermined slot location in storage shelf 20. Host processor 10 logically divides storage shelf 20 into a backup portion 25 which stores the optical disks recorded on the optical drive 21 and a primary portion 26 which stores optical disks recorded in an intermediate level of the data storage hierarchy to be next described. It can be expected that backup portion 25 will be remotely located from primary portion 26 for providing enhanced disaster recovery.

An intermediate level of the peripheral data storage hierarchy consists of one or more warehouse type optical disk or media libraries 28 and 29. Each of the libraries includes an open sided wall having a large plurality of storage slots or cells for receiving an optical disk for physical storage. In the open sided wall are up to four optical disk drives denominated D0, D1, D2, and D3 in media library 28; it being understood that media library 29 has an identical set of optical disk drives. Each of the optical disk drives D0–D3 is operatively coupled to host processor 10 for exchanging data object copies with storage area 11. The plurality of double-headed arrows 30 signify the individual operative coupling between storage area 11 and the eight illustrated optical disk drives in the media libraries 28 and 29. Additionally, each of the media libraries 28 and 29 has an I/O station 31 which receives manually carried optical disks for insertion into the automatic warehouse type library and for ejecting optical disks to be manually picked up from the optical disk libraries as indicated by dashed-line double-headed arrow 32. Arrow 32 signifies the manual transport of optical disks between the I/O stations 31 of the two media 28 and 29 and the primary portion 26 of the storage shelf 20. Each of the media libraries 28 and 29 includes a traveling elevator which traverses the entire extent of the open face wall for accessing all of the storage compartments or cells, and all of the optical disk drives D0–D3 and the I/O station 31 for automatically retrieving and storing optical disks. Such a library can be constructed as shown by Rudy et al. in U.S. Pat. No. 4,608,679. Other warehouse type library configurations can be employed as well. Each of the media libraries 28 and 29 has a control section C 33 which manages the movements of the traveling elevator in accessing the various storage cells, (not shown), the optical disk drives D0–D3 and the I/O stations 31. Control section C 33 is operatively coupled to host processor 10 library manager portion LM 34 as indicated by double-headed arrow 35. LM 34 operates the library in an efficient manner which is beyond the scope of the present description, it being sufficient to say that the media libraries 28 and 29 automatically respond to commands from host processor 10 for inserting and removing optical disk media to and from the various drives for facilitating data transfers between storage area 11 and the respective optical disk drives.

In an early embodiment of the invention, during a predetermined time of each daily cycle, such as late at night, a copy of all of the named data objects received from IIS 12, during the preceding period and since the last recording, are recorded onto optical disk media in the media libraries 28 and 29 as primary copies of the named data objects. At a similar time during the day, the backup copies are separately recorded on optical drive 21. The sequence of recording onto the media library 28 and 29 drives D0–D3 can be entirely different from the backup sequence of recording data objects into optical disks contained in recorder 21. Not all received named data objects need be recorded in a backup mode. Storage area 11 includes a rule for determining which named data objects should be backed up and which named data objects should only have a primary copy made for storage in media libraries 28 or 29. Of course, if desired, all received named data objects can have two copies, one a primary copy and the second a backup copy, in addition to the copy residing in the object store 13. Alternately, there may be a class of named data objects with access requirements requiring named data objects in such class will remain in disk drive 13. Such named objects could have backup copies only; i.e. no primary copies are made in media library 28 nor 29.

After the primary copy of the received named data object is moved from a media library 28, 29 into storage shelf 20, access to that disk is preferably through the stand-alone optical drive 21, which provides an independent access to the bottom level of the data-storage hierarchy. As usual, the first level of disk drive 13 has its accesses independent of the other two levels in the hierarchy. In accordance with the invention, the intermediate level, media libraries 28, 29, have their respective independent access paths as does the bottom level or storage shelf 20 and optical drive 21. Except for backup copies, volume table 46 stored in peripheral disk drive 16, is updated each time a new copy is made or deleted and each time the optical disk media (note media is plural of medium) are moved from one location to another, as will become apparent. After a predetermined time, such as one day, one week, one month, or three months, a copy of the received named data object is erased from the top storage level or disk drive 13. This action leaves up to two copies, a primary copy stored in the media library 28, 29, and a back up copy stored in the storage shelf 20. After a further time, the primary copy which is recorded on an optical disk of media library 28, 29, is transferred through I/O station 31 to the primary portion 26 of the bottom level of the peripheral data storage hierarchy.

The sequence of copying named data objects from disk drive 13 to the media library 28, 29 is determined by rules established in storage area 11. As an example, negotiable instruments can be clustered onto individual optical disks as letters, contracts etc. are clustered onto other optical disks designated to receive such categories or classes of named data objects. The retention period for primary copies of clustered objects in disk drive 13 varies with each class; e.g. copies of negotiable instruments are removed first, followed by letters, then contracts. Movement of media from an intermediate level or media library 28 or 29 to bottom level or storage shelf 20 varies in a similar manner. As such, the sequences of backup copies and primary copies in the respective optical media are unrelated sequences.

While such transferred optical disks could be reinserted into the media library 28 or 29, according to the invention it is more efficient to have them manually loaded into optical disk 21 for subsequent named data object retrieval. The reason for such efficiency is that the references by host processor 10 to the older or aged named data objects can be expected to be few with the accesses being spaced apart over substantial periods of time. Further, such access could be for only one or two named data objects on a optical disk which stores a relatively large number of such named data objects. Accordingly, to use the mechanisms of the media libraries 28, 29, for accessing but a single named data object is less efficient than manually loading a stand-alone optical disk recorder.

Figure 2:
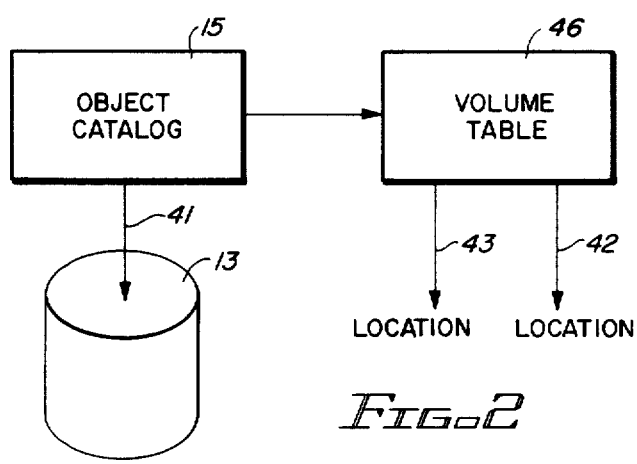
FIG. 2 is a simplified diagrammatic showing of accessing data storage areas at various levels of the peripheral data storage hierarchy shown in FIG. 1.

The accessing of a recorded named data object is described with particular reference to FIG. 2. Host processor 10 first accesses the object catalog 15 as stored in disk drive 16. In addition to object catalog 15, which indexes the data stored within the hierarchy, configuration table (not shown but well known) describes the physical configuration of the devices of the hierarchy. Volume table 46 is a part of such a configuration table. Volume table 46 stores indications of the physical locations of the volumes by VOLSER irrespective of whether stored in the media library 28 or 29, or in the storage shelf 20 backup and primary portions 25 or 26. The object catalog 15 indicates and identifies where the named data objects are stored in the peripheral data storage hierarchy. When the object catalog 15 indicates that a copy still resides in the top or first level in disk drive 13, host processor 10 is able to retrieve, as indicated by arrow 41, the named data object directly from disk drive 13. If on the other hand host processor 10 finds that object catalog 15 signifies that a copy of the named data object is no longer in the disk drive 13 of the peripheral data storage hierarchy, it accesses volume table 46 to determine the physical location of the containing volume. Depending upon the location of the containing volume, host processor 10 goes to either the intermediate level consisting of media libraries 28, 29, or to the bottom level including optical drive 21 and storage shelf 20. Arrow 42 indicates that the optical disk storing the requested named data object still has a copy in the media library 28 or 29. Host processor 10 then actuates LM 34 to fetch the optical disk and insert it into one of the optical disk drives D0–D3 of the respective library. Host processor 10 then accesses the named data object from such library drive. On the other hand, volume table 46 may indicate to host processor 10 that the volume containing the primary copy of the named data object is in the bottom level of the data storage hierarchy. This action is indicated by arrow 43 causing host processor 10 to issue a mount message to personnel manning the bottom level of the data storage hierarchy instructing them to move an optical disk stored in the predetermined or addressed storage location in the primary storage 26 to optical drive 21. Once mounted, object management in the storage area 11 accesses the requested optical disk by addressing optical disk drive 21. Thereafter, the reading operation follows usual disk reading procedures.

The object catalog 15 includes a large plurality of entries. Each entry includes the name of a received named data object, a field indicating whether or not a copy is in the top level or disk drive 13 and a VOLSER of the volume on the optical disk storing the named data object as a primary copy and a VOLSER of the optical disk storing a backup copy of the named data object. Peripheral disk drive 16 further has the volume table 46 retentively stored therein. The volume table 46 includes indexed entry fields in each entry identifying the VOLSER on the A and B sides of the optical disk. The volume table also includes a location byte indicating whether the primary copy still resides in an intermediate level or the media library 28, 29 or is only stored in the bottom or lower level primary portion 26. If the optical disk is still in the media library 28, 29, then the cell or slot number, drive, or other location within the library wherein the optical disk currently resides, is indicated in the entry for the volume. This entry also indicates the name of the media library 28 or 29 in which the optical disk resides. Internally to the individual libraries, the location within the library of the optical disk having VOLSER A and B can be an address of either the storage cell or slot, whether or not the optical disk is being held by a traveling elevator, whether or not the optical disk is currently residing in a drive of the library or is in the I/O station 31. If a location byte of the volume table 46 entry indicates the primary copy is in primary portion 26 of the bottom level of the hierarchy, then the actual shelf address of the slot storing the optical disk is indicated. In any event, host processor 10 can automatically cause the optical disk to be moved to one of the optical disk drives D0–D3 in the intermediate level or send a message to personnel at the shelf unit for mounting the primary optical disk copy onto optical disk drive 21. Host processor 10 always fetches the named data object from the level having the fastest access response via an independent access path to the level storing a copy of the requested named data object.

Figure 3:
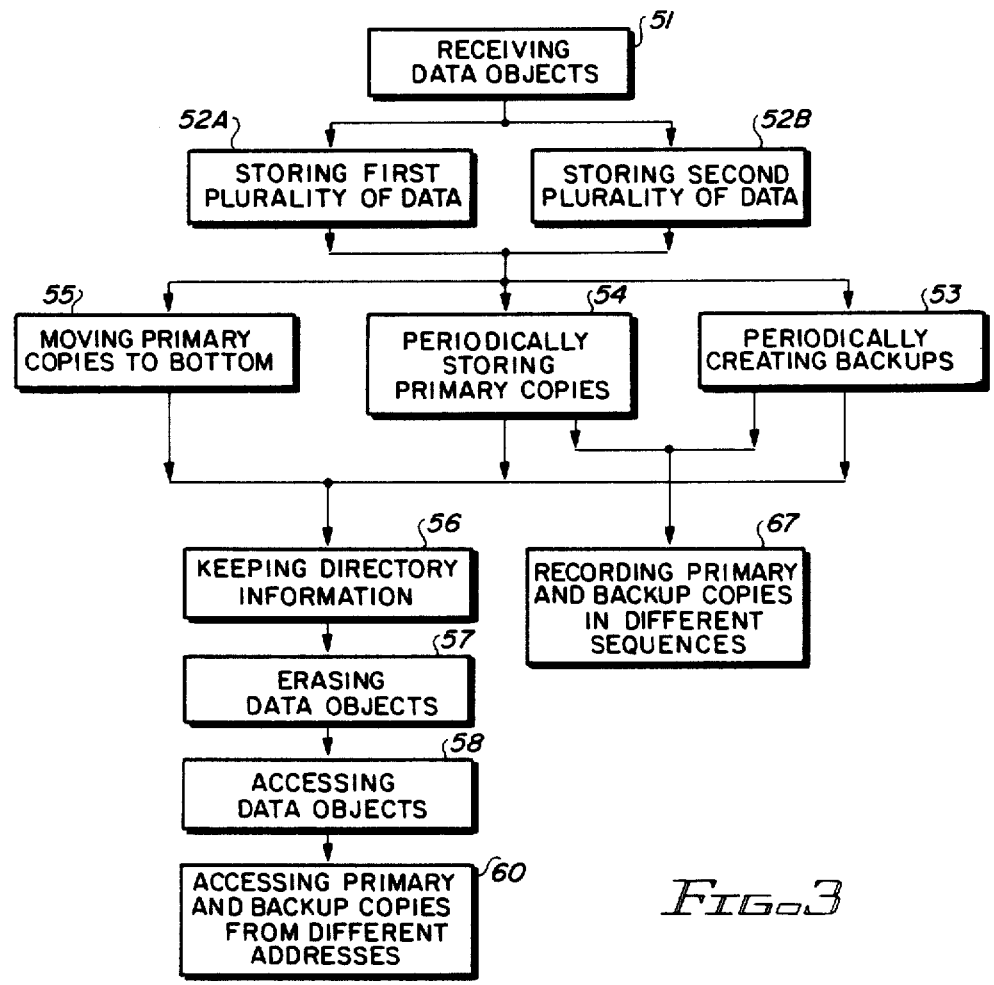
FIG. 3 is a flow diagram showing a method of operation of the peripheral data storage hierarchy shown in FIG. 1.

FIG. 3 is a flow diagram representation of a portion of the operation of the peripheral data storage hierarchy shown in FIGS. 1 and 2. Data objects from an outside source, is sequentially received in step 51 with a first plurality of the data objects stored in the top level in step 52A, a second plurality of the data objects stored in the top level in step 52B. In step 53 a backup copy of a portion of data stored in step 52A or 52B is periodically made in the storage shelf 20. A primary copy of the data objects is stored to the media library 28 in step 54 on a periodic basis, while the primary copy is moved to the storage shelf 20 in step 55 on a less often periodic basis. In step 56 each one of the data objects that has been stored in identified in the object catalog 15, the identification including how many copies have been made, and locations of each copy which includes an address in a unique address field. The data stored in steps 52A and 52B is erased from time to time in step 57. When data is fetched in step 58, it is fetched from the level storing the data and having the shortest access time. Step 67 includes recording primary copies of the data objects in a primary copy sequence, and recording backup copies of the data objects in backup sequence not related to the primary copy sequence. Included in step 68 is accessing the primary copies in the another level according to the primary copy's predetermined address space and accessing the backup copy in the bottom level according to the backup copy's predetermined address space.

Figure 4:
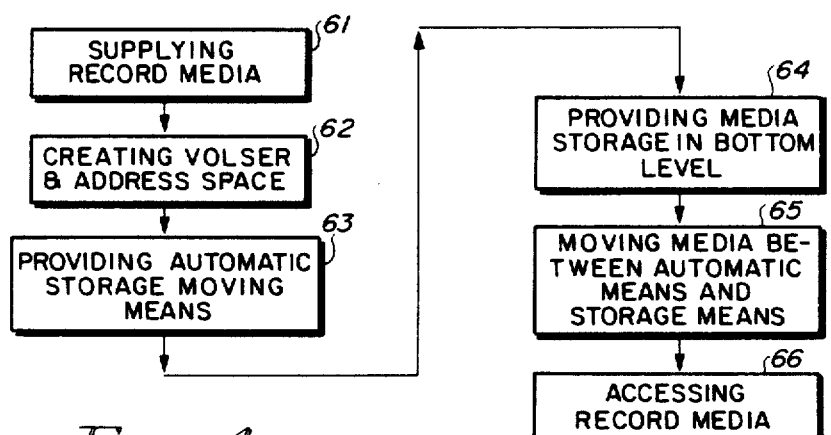
FIG. 4 is a flow diagram showing another portion of a method of operation of the peripheral data storage hierarchy shown in FIG. 1.

FIG. 4 is a flow diagram representation of another portion of a method of operation of the peripheral data storage hierarchy shown in FIGS. 1 and 2. As shown in FIG. 4, a plurality of transportable record media is supplied to the another and bottom levels (media library 28 and storage shelf 20, respectively) in step 61 wherein the record media is useable in both the another and bottom levels. A unique VOLSER identification and address space is created for each record media in step 62. A traveling library 33 is provided in step 63 for automatically moving record media between passive storage cells and a recorder capable of reading all of the record media. The bottom level or storage shelf 20 provides media storage shelves and a recorder able to read and write the recorded media in step 64, and step 65 includes moving the record media between the traveling library 33 and the storage shelf 20. Record media is accessed in step 66 from either the another level (media library 28) or the bottom level (storage shelf 20) if the record media has been stored in the another level or the record media may be accessed directly from the bottom level if the record media was originally recorded in the bottom level.

While the invention has been particularly shown and described with reference to preferred embodiments thereof, it will be understood by those skilled in the art that various changes in form and details may be made therein without departing from the spirit and scope of the invention.

What is claimed is:

1. An improved peripheral data storage hierarchy for storing named data objects and having a plurality of storage levels, a first one of said levels being a top level having access characteristics faster than any other level, a second one of said levels being a bottom level and having access characteristics slower than any other level, and including a level intermediate said top and bottom levels having access characteristics intermediate to that of said faster and slower access characteristics;

the improvement including, in combination:

processor means for providing a store and a retrieve instruction;

input means for supplying named data objects to be stored in a sequence of said named data objects;

management means in said processor means, coupled for receiving the store and retrieve instructions and coupled to said input means an having a separate independent access path to each of said levels for independently accessing at least one of said levels according to predetermined rules for initially storing said named data objects by making copies of said named data objects to said top level, said management means making primary and backup copies of selected ones of said named data objects for storage in said intermediate and bottom levels, respectively, upon receiving the store instruction, said management means further retrieving a predetermined one of said first, primary or backup copies of said named data objects from one of said levels having fastest access characteristics and containing a copy of said named data object upon receiving a retrieve instruction; and catalog means coupled to said management means for retentively storing as instructed from said management means an entry for each of the named data objects stored in said data storage hierarchy, each entry including a name of one named data object of said named data objects, a number of said levels containing copies of said one named data object and a storage location for each copy of said one named data object in said levels.

2. In the data storage hierarchy set forth in claim 1, further including, in combination:
    primary means in said bottom level coupled to said top and intermediate levels of said data storage hierarchy for receiving first and primary copies of said named data objects for storing said first and primary copies at storage locations that are updated in said catalog means and in a sequence independent to the sequence in which the named data objects are received by said management means from said input means;
    backup means in said bottom level and coupled to said management means and to one of said levels for receiving one of said backup copies of predetermined ones of said named data objects; and
    said management means accessing said backup copy of any named data object when stored in said bottom level via either said intermediate level or directly from said bottom level and accessing said backup copy of any predetermined named data object directly from said bottom level.

3. In the data storage hierarchy set forth in claim 2, further including, in combination;
    said intermediate and bottom levels of the hierarchy having a multiplicity of movable data storage media, each of said data storage media including a VOLSER identification, said intermediate level having storage cells for respectively storing said media and a plurality of removable-media drives for receiving and recording and reading said named data objects on and from said media, respectively; automatic means in the intermediate level for moving said media between said storage cells and said drives, said automatic means being coupled to said management means for responding to a need to record or read to move said media between said storage cells and said drives;
    said bottom level including a backup removable media drive operatively coupled to said backup means for receiving a copy of said predetermined named data objects as said backup copies and recording same onto predetermined ones of said record media in the sequence received from said data means;
    a storage shelf in said bottom level having addressable media storage locations;
    said management means having means indicating a desired movement of said predetermined ones of said media between said storage shelf and said backup drive; and
    further means in the primary means for indicating a desired movement of record media recorded in said intermediate level between said storage shelf and said intermediate level.

4. In the data storage hierarchy set forth in claim 3, further including, in combination:
    each of said record media having its unique address space; and
    said catalog means indicating location of all of said copies of the named data objects as an address of said top level, and as a VOLSER for each copy in one of said record media in said intermediate and bottom levels.

5. In a machine-effected method of operating a peripheral data storage hierarchy for storing and retrieving named data objects according to predetermined rules, the data storage hierarchy having a plurality of data storage levels, a first of said levels being a top level with a shortest access time of any of said levels, a second of said levels being a bottom level with a longest access time of any of said levels, another level coupled to said top and bottom levels having an access time intermediate to the shortest and longest access times;
    the machine-executed steps of:
    sequentially receiving from an outside source a multiplicity of named data objects to be stored in the data storage hierarchy;
    for a first plurality of the received named data objects, initially storing a first copy of each one of said first plurality of said named data objects in the top level;
    for a second plurality of the received named data objects, initially storing a first copy of each one of said second plurality of said named data objects in the top level;
    periodically creating backup copies of the first plurality of the received named data objects and storing the backup copies in the bottom level of the data storage hierarchy;
    first periodically storing a plurality of primary copies of each of said first copies of said first and second received named data objects in said another level;
    second periodically less often than said first periodic storing, moving the primary copies from said another level to said bottom level;
    keeping a directory identification of each named data object, a number of copies made of each said named data object and a location identification in the data storage hierarchy of each of said copies, including keeping an address of each copy location identification in an address field unique to each of said levels, respectively;
    from time to time erasing the first copy of the first and second pluralities of given named data objects from said top level; and
    accessing a given named data object by fetching the respective copy thereof from the level having a shorter access time than any other level storing a copy of the given named data object directly without moving any accessed copy through any level having a shorter access time than the level being accessed.

6. In the machine-effected method set forth in claim 5, further including, the machine executed steps of:
    supplying a plurality of transportable record media for use in said another and bottom levels such that the record media are usable in either of said levels;
    for each of said record media, creating a unique VOLSER identification and a separate address space for identifying and locating each of said record media;
    in said another level, providing automatic means for moving the record media between passive storage cells and automatic recorder means usable with any of said record media;
    providing media storage means in said bottom level including recorder means usable with any of said record media;
    moving the record media between said automatic means and said media storage means; and
    accessing said record media from either said another level or said bottom level if such record media were stored in said another level or directly from said bottom level if originally recorded in said bottom level.

7. In the machine-effected method set forth in claim 6, further including the machine-executed steps of:
recording said primary copies in a first sequence of named data objects and recording said backup copies of the named data objects in a second sequence of data objects unrelated to the first sequence; and
accessing said primary copies in said another level using a first predetermined address space and accessing said backup copies in said bottom level using a second predetermined address space.

* * * * *